(12) United States Patent
Steinberg

(10) Patent No.: US 6,737,223 B2
(45) Date of Patent: May 18, 2004

(54) FIBER OPTIC CHIP WITH LENSLET ARRAY AND METHOD OF FABRICATION

(75) Inventor: Dan A. Steinberg, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 277 days.

(21) Appl. No.: 09/903,077

(22) Filed: Jul. 11, 2001

(65) Prior Publication Data

US 2002/0015920 A1 Feb. 7, 2002

Related U.S. Application Data

(60) Provisional application No. 60/223,163, filed on Aug. 7, 2000.

(51) Int. Cl.[7] .................................................. G02B 6/32
(52) U.S. Cl. ........................... 430/321; 430/330; 216/26
(58) Field of Search ................................. 430/321, 330; 216/26; 385/33, 15

(56) References Cited

U.S. PATENT DOCUMENTS

| 4,689,291 A | 8/1987 | Popovic et al. ............. 430/321 |
| 5,281,301 A | 1/1994 | Basavanhally ............... 156/629 |
| 5,346,583 A | 9/1994 | Basavanhally ............... 156/629 |
| 5,357,590 A | 10/1994 | Auracher ....................... 385/33 |
| 5,446,815 A | 8/1995 | Ota et al. ....................... 385/33 |
| 5,518,863 A | * 5/1996 | Pawluczyk ................... 430/321 |
| 5,871,888 A | 2/1999 | Heremans et al. ........... 430/321 |

* cited by examiner

*Primary Examiner*—John A. McPherson
(74) *Attorney, Agent, or Firm*—Neils Haun; Jonathan D. Baskin

(57) ABSTRACT

A fiber optic chip having one or more fiber-retaining channels and a respective number of lenslets disposed in registry with the channels is provided. The fiber optic chip includes a substrate having a first surface and an etch stop layer disposed proximate the first surface of the substrate. A fiber retaining channel is disposed within the substrate. The fiber channel has an end disposed proximate the first surface of the substrate and has a longitudinal axis extending along the channel. A lenslet is disposed on the etch stop layer and has an optical axis substantially aligned with the longitudinal axis of the channel. In addition, a process is provided for creating a fiber optic chip. The process utilizes the channels as an exposure mask to mark the locations of the lenslets relative to the channels to ensure that the lenslets are accurately registered relative to the respective channels.

40 Claims, 11 Drawing Sheets

FIBER OPTIC CHIP WITH LENSLET ARRAY AND METHOD OF FABRICATION

Applicants claim the benefit of priority of U.S. Provisional Application No. 60/223,163, filed on Aug. 7, 2000, the entire contents of which are incorporated herein by reference.

FIELD OF THE INVENTION

The present invention relates generally to a chip for retaining optical fibers in registry with a lenslet and a process for fabrication of the chip, and more specifically to a process which uses fiber-retaining channels in the chip as an exposure mask for the creation of the lenslet.

BACKGROUND OF THE INVENTION

Optical data communication networks utilize a large number of optical fibers which need to be accurately aligned with other system components to effect efficient coupling between the fibers and the system components. Similarly, fiber optic imaging systems make use of a plurality of optical fibers having inputs that need to be aligned and coupled, i.e. spaced at proper conjugates to the object and image planes The coupling of optical signals from the fibers of both data communication networks and imaging systems benefits from fiber optic chips that include lenslets disposed near the endface of the fibers. Such lenslets focus and direct the light emitted or received by the fibers.

However, the use of lenslets creates additional degrees of freedom which must be controlled during the manufacturing process of the fiber optic chip. In particular, it is important to align the lenslet to the optical axis of the fiber, which may be accomplished by aligning the lenslet to a fiber-retaining channel that holds the optical fiber within the chip.

With conventional photolithographic processes, the alignment of the lenslet to a fiber-retaining channel requires additional processing steps in which an exposure mask must be separately registered to the fiber-retaining channel to define the location of the lenslet to be formed. Using an exposure mask in this manner introduces additional processing variables that must be controlled. As a result, the cost of the manufacturing process ultimately increases while the accuracy with which the lenslet location may be determined potentially decreases. A need therefore remains for a manufacturing process for creating a fiber array having lenslets registered to respective optical fibers, which utilizes fewer processing steps. In particular, it would be desirable to provide a process which effects registry between a lenslet and its respective fiber-retaining channel as the lenslet is formed.

SUMMARY OF THE INVENTION

In accordance with the present invention, a fiber optic chip having one or more fiber-retaining channels and a respective number of lenslets disposed in registry with the channels is provided. In addition, a process is provided for creating the fiber optic chip, where the process utilizes the channels as an exposure mask to define the locations of the lenslets. The use of the channels as an exposure mask ensures that the lenslets are accurately registered relative to the respective channels.

The fiber optic chip includes a substrate having a first surface and an etch stop layer disposed proximate the first surface of the substrate. A fiber retaining channel is disposed within the substrate. The fiber channel has an end disposed proximate the first surface of the substrate and has a longitudinal axis extending along the channel. A lenslet is disposed on the etch stop layer and has an optical axis substantially aligned with the longitudinal axis of the channel. The fiber optic chip may optionally include an alignment feature in the substrate.

The process includes a step of providing a masking layer, which includes a mask aperture, on a first surface of a substrate to mark the intended location of a fiber channel. A portion of the substrate located within the mask aperture is selectively removed to create the fiber channel. In addition, a processing material layer is provided on a second surface of the substrate opposite the first surface of the substrate. The processing material is exposed with light of a selected wavelength which is transmitted through the fiber channel to create an exposed region in the processing material layer. In this manner, the fiber channel functions as a mask, ensuring that the exposed region of the processing material layer is in registry with the fiber channel. Next the unexposed portion of the processing material layer is selectively removed to create a lenslet preform which is positioned in registry with the fiber channel. The lenslet preform is then processed, for example by heating, to impart a lenticular shape to the preform, thereby creating a lenslet in registry with the fiber channel.

Optionally, the masking layer may include an alignment feature aperture for the purpose of defining the location of an optional alignment feature. The optional alignment feature is formed by selectively removing a portion of the substrate located within the alignment layer aperture. For example, the alignment feature may be formed by an anisotropic etching process to create an alignment feature having a sidewall which is inclined with respect to the first surface of the substrate.

Additionally, the step of providing the processing material layer may optionally comprise providing one or more additional layers. A first such variation of the process comprises providing an optional etch stop layer adjacent the second surface of the substrate and providing a photosensitive lenslet-forming layer adjacent the etch stop layer. The etch stop layer is provided so that the substrate removal step may extend to the depth of the second surface of the substrate. Such a fiber channel extends from the first surface of the substrate to the second surface of the substrate. The photosensitive lenslet-forming layer may be further processed to create a lenslet, in a manner similar to that described above.

A second variation of the process comprises providing a processing material layer having an etch stop layer adjacent the second surface of the substrate, a lenslet-forming layer adjacent the etch stop layer, and a photo-sensitive layer adjacent the lenslet-forming layer. This three-layer configuration, which includes a separate photo-sensitive layer, permits the use of the lenslet-forming layer which is not photosensitive. The photo-sensitive layer is then exposed with light of a selected wavelength through the fiber channel to create an exposed region of the photo-sensitive layer. The process further comprises the step of removing the unexposed region of the photo sensitive layer to provide a lenslet mask comprising the exposed region of the light-sensitive layer. In turn, creation of the lenslet preform includes the step of selectively removing a portion of the lenslet forming layer not protected by the lenslet mask. Subsequent the formation of the lenslet preform, the lenslet mask may be removed from the lenslet preform, prior to creation of a lenslet from the lenslet preform. A third variation of the process is also provided and is substantially the same as the second variation but omits the etch stop layer. In this third case, the lenslet-forming layer is disposed adjacent the second surface of the substrate.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 7:
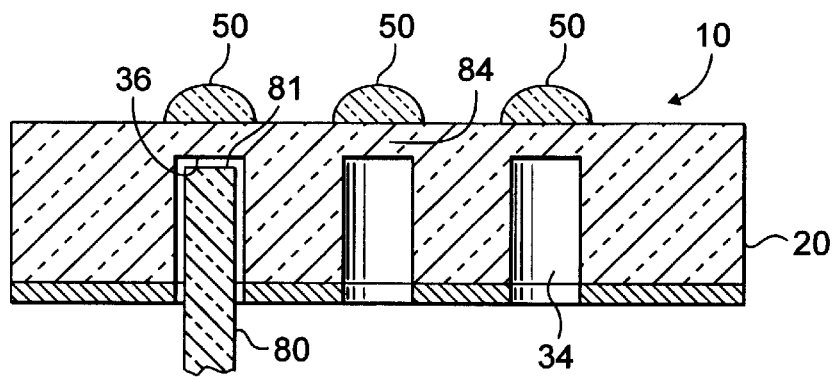
FIG. 7 schematically illustrates a cross-sectional view of a fiber optic chip formed from the substrate of FIG. 6 having lenslets formed by processing the lenslet preforms depicted in FIG. 6.

In accordance with the present invention, a fiber optic chip 10, having one or more fiber-retaining channels 34 and a respective number of lenslets 50 disposed in registry with the channels 34, and a process for fabricating the fiber optic chip 10 are provided, as best shown, for example, in FIG. 7. Registration between the lenslets 50 and the channels 34 is ensured by using the channels 34 as an exposure mask during creation of the lenslets 50. Such a use of the channels 34 inherently creates registration between the lenslets 50 and the channels 34, which in turn provides proper alignment between the lenslets 50 and the fibers 80 retained in the fiber optic chip 10.

Figure 1:
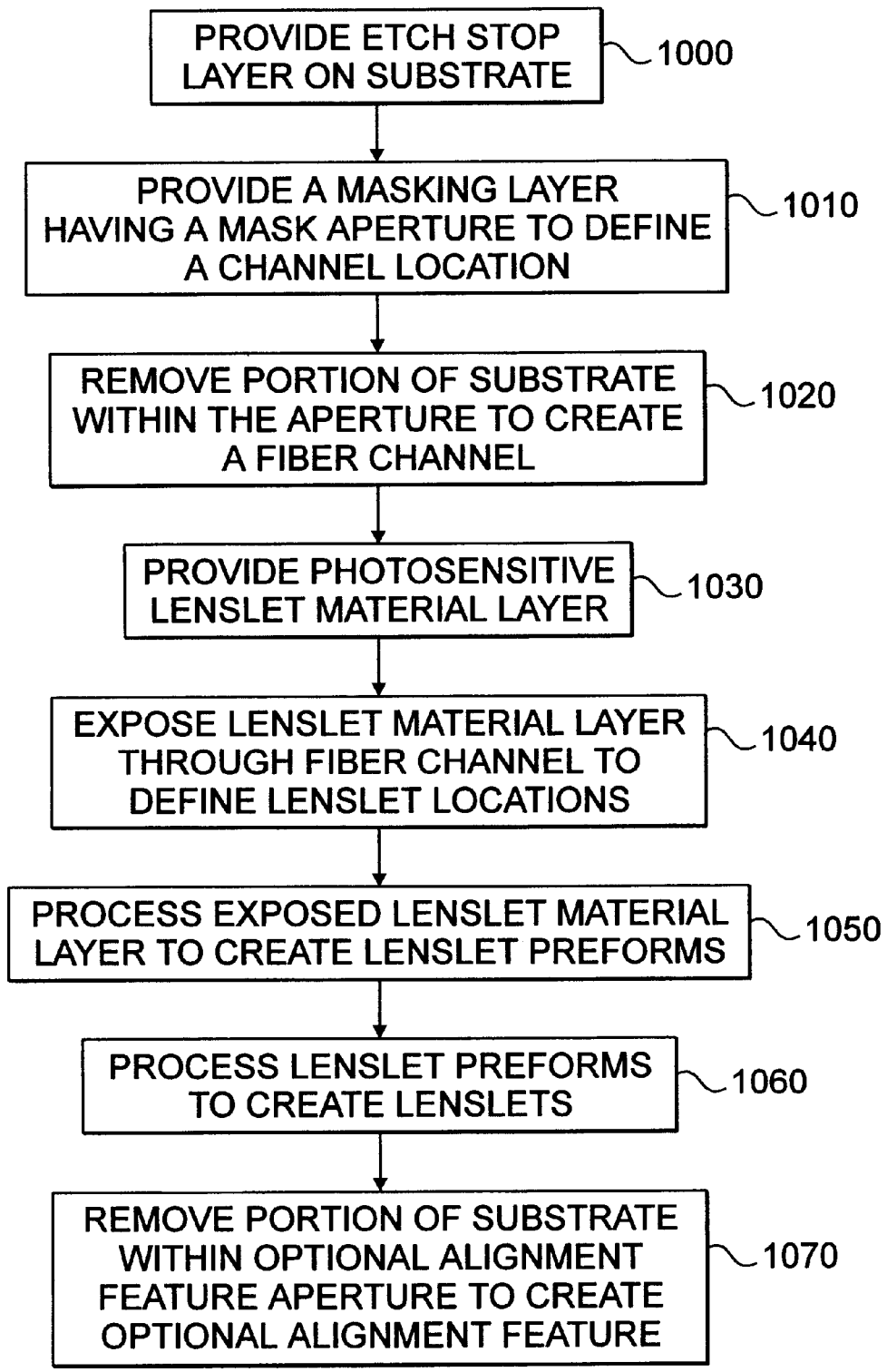
FIG. 1 illustrates a flowchart representing a process in accordance with the present invention for creating a fiber optic chip having a fiber optic channel that is used as an exposure mask to mark the location of a lenslet on the chip in registry with the channel.

A process of the present invention for creating a fiber optic chip 10 having a fiber retaining channel 34 formed in a substrate 20 in registry with a lenslet 50 is illustrated in the flowchart of FIG. 1. The process in accordance with the present invention may be practiced having an etch stop layer, as provided at step 1000 of FIG. 1, disposed on a substrate for fabrication of the fiber optic chip as depicted in FIGS. 11–17. Alternatively, the process of the present invention may also be performed without providing an etch stop layer on the substrate for the purpose of fabricating, for example, the fiber optic chip depicted in FIGS. 3–10. Providing an optional etch stop layer, at step 1000, provides certain advantages, such as permitting the use of a non-transparent substrate material. On the other hand, a more simplified process may be practiced by omitting the step of providing the etch stop layer. Accordingly, the present invention provides for processes for creating a fiber optic chip that may either include or omit the etch stop layer set forth as step 1000 of FIG. 1.

Beginning with the process variation depicted in FIGS. 3–10, which omits step 1000, a substrate 20 is shown having a masking layer 30 disposed on a first surface 22 of the substrate 20, as provided by step 1010 of FIG. 1. The masking layer 30 includes one or more mask apertures 32 which provide access to associated portions of the substrate 20. The location and size of the mask apertures 32 provide a template in the masking layer for marking the location and width of fiber-retaining channels 34 to be created in the substrate 20. The mask apertures 32 may have a circular cross-section corresponding to the diameter of a fiber 80 to be retained in the fiber optic chip 10. Alternatively, the mask apertures 32 may have a cross-section corresponding to that of a polarization-maintaining fiber, such as a D-shaped cross-section, for example.

The masking layer 30 may be provided using any suitable technique, such as photolithographic processes, for applying or depositing such masking layer 30 on the first surface 22 of the substrate 20. Such processes may be used to provide a masking layer 30 comprising, for example, silicon nitride, silicon dioxide, or a metal, or other material capable of selectively resisting subsequent substrate removal processes, such as reactive ion etching (RIE).

Figure 4:
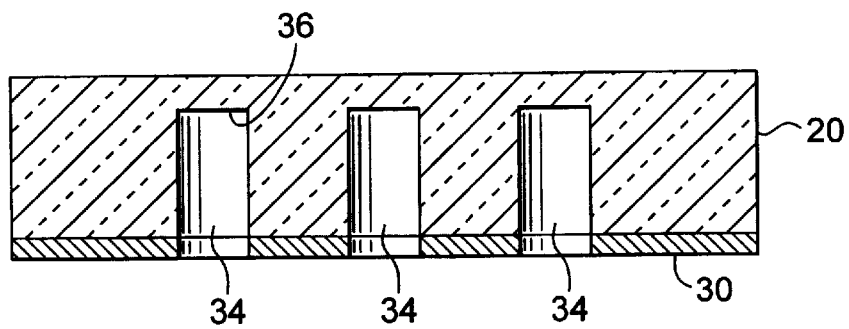
FIG. 4 schematically illustrates a cross-sectional view of the substrate of FIG. 3 with a portion of the substrate removed to create fiber channels.

Turning to FIG. 4, fiber-retaining channels 34 of a desired shape and depth are formed in the substrate 20 by removing, at step 1020, portions of the substrate 20 which are accessible through the mask apertures 32. The channels 34 do not necessarily pass entirely through the substrate 20. Instead, the channels 34 may be formed as cavities having terminating end walls 36 disposed internal to the substrate 20. The channels 34 may be created using any process suited to removing portions of the substrate 20 without degrading or removing the masking layer 30. Such processes may include, for example, reactive ion etching, physical etching, focused ion-beam milling, photochemical etching, electrochemical etching, and wet and dry chemical etching. In particular, processes by which step 1020 may be practiced should permit removal of sufficient substrate material to create a fiber channel 34 which extends a suitable distance into the fiber optic chip 10 to permit retention of a fiber 80 therein and particularly a fiber end 81, as illustrated in FIG. 7. Preferably, the removal process of step 1020 should be selected to avoid undercutting of the masking layer 30.

The substrate 20 is formed from a material that permits creation of the fiber channels 34 therein and has sufficient mechanical strength to support a fiber 80 within a fiber channel 34. Furthermore, the substrate 20 should comprise a material that is optically transparent to light transmitted by a fiber 80. The fiber 80 is contained within the channel 34 so that the fiber end 81 is positioned proximate to channel end wall 36. Transparency of the substrate 20 is desirable, because light transmitted by a fiber 80 within the channel 34 must pass through a bridge portion 84 of the substrate 20 disposed intermediate channel end wall 36 and lenslet 50, as shown in FIG. 7. In addition, the substrate 20 should comprise a material that is optically transparent to the wavelength of light used to expose a lenslet material deposited on the substrate to create lenslets 50. Since the substrate 20 is transparent, the marking layer 30 should be substantially opaque to the wavelength of light.

Figure 5:
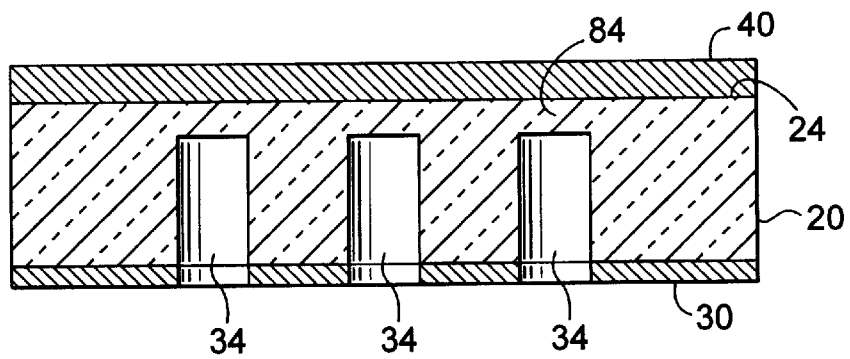
FIG. 5 schematically illustrates a cross-sectional view of the substrate of FIG. 4 on which a photosensitive lenslet material layer is disposed.

Returning to FIG. 1, photosensitive lenslet material layer 40 is provided, at step 1030, on a second surface 24 of the substrate 20, as shown in FIG. 5. The photosensitive layer 40 is applied to the second surface 24 of the substrate 20 opposite to the first surface 22 on which the masking layer 30 is applied. The photosensitive lenslet material layer 40 comprises a material that can be processed to create lenslets 50. In particular, the photosensitive lenslet material layer 40 comprises a material that may be exposed to light of a selected wavelength to create exposed regions from which the lenslets 50 are formed. The photosensitive lenslet material layer 40 may comprise, for example, photoresist.

The photosensitive lenslet material layer 40 is exposed, at step 1040, to light of a selected wavelength transmitted through the mask apertures 32 into the channels 34. The light is transmitted through the bridge portions 84 of the substrate 20 disposed between the end walls 36 and the photosensitive lenslet material layer 40 to create exposed regions in the photosensitive lenslet material layer 40. Collimated light may be used to create exposed regions having a cross-section matched to that of the channels 34. By using the channels 34 to create the exposed regions, such exposed regions are thereby positioned in registry with the respective channels 34. Since the exposed regions mark the future location of the lenslets 50, exposure of the photosensitive lenslet material layer 40 through the channels 34 ensures that the lenslets 50 will be accurately positioned in registry with the channels 34.

Figure 6:
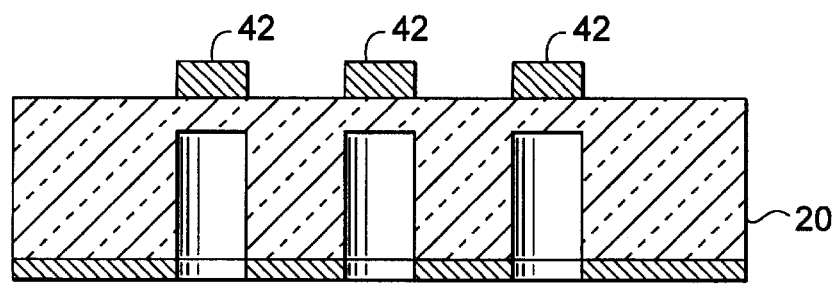
FIG. 6 schematically illustrates a cross-sectional view of the substrate of FIG. 5 having portions of the photosensitive lenslet material layer removed to create lenslet preforms in registry with the fiber channels.

Next, unexposed portions of the photosensitive lenslet material layer 40 are selectively removed, at step 1050, to create lenslet preforms 42 from the exposed portions of the photosensitive lenslet material layer 40, as shown in FIG. 6. Standard photoresist processing techniques, or other suitable methods, may be used to selectively remove the unexposed portions of the photosensitive lenslet material layer 40. Optionally, a portion of the substrate 420 proximate the unexposed portions of the photosensitive lenslet material layer may also be removed to create pedestals 45 on which the lenslet preforms 442 are disposed, as depicted in FIG. 8.

Figure 8:
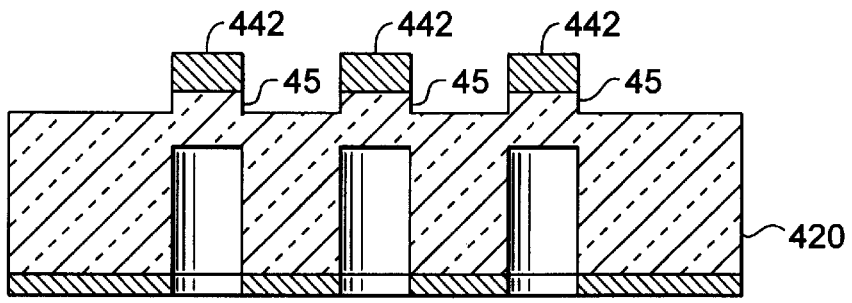
FIG. 8 schematically illustrates a cross-sectional view of a substrate having portions of a photosensitive lenslet material layer and the substrate removed to create lenslet preforms disposed on pedestals.
Figure 9:
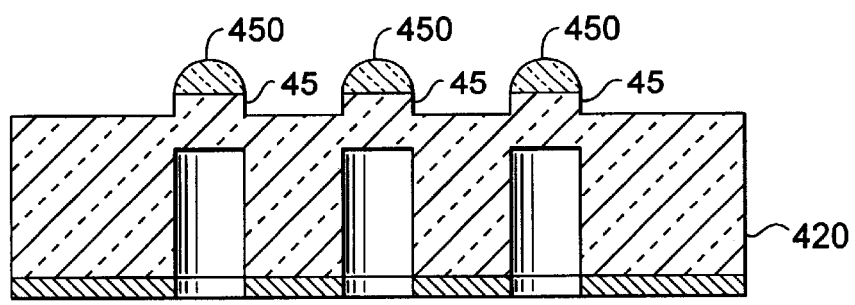
FIG. 9 schematically illustrates a cross-sectional view of a fiber optic chip formed from the substrate of FIG. 8 having lenslets formed by processing of the lenslet preforms depicted in FIG. 8.

The lenslet preforms 42, 442 of the configurations of FIGS. 6 and 8 are further processed to impart a lenticular shape to the lenslet preforms 42, 442 creating the lenslets 50, 450 at step 1060. For example, the lenslet preforms 42 may be heated at step 1060 to cause flow of the lenslet preforms 42 to form lenslets 50. In a similar manner, the lenslet preforms 442 of FIG. 8 may be heated to create the lenslets 450 shown in FIG. 9.

Figure 10:
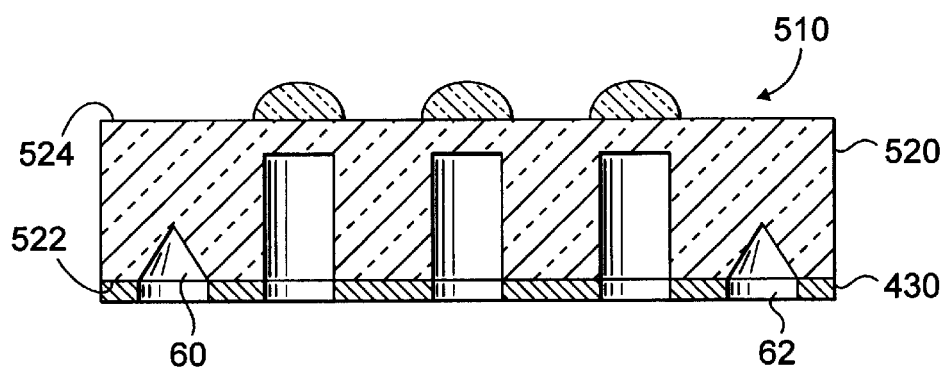
FIG. 10 schematically illustrates a cross-sectional view of a fiber optic chip in which an alignment feature is provided.

As an additional optional step, an alignment feature 60 may be formed, at step 1070, within the first surface 522 of the substrate 520, as shown in FIG. 10. An alignment feature 60 permits registration of the fiber optic chip 510 with other system components. If an alignment feature 60 is desired, the masking layer 430 may include an alignment feature aperture 62 positioned to mark the location of the alignment feature 60 to be formed in the substrate 520. The alignment feature 60 may be formed by a suitable process that imparts a desired shape, such as a V-shaped groove or pit. The alignment feature 60 may be formed with other desired shapes. For example, the alignment feature 60 may be formed having sidewalls perpendicular to the first surface 522. Although the alignment feature 60 is illustrated in the first surface 522 of the substrate 520, the alignment feature may also be formed in the second surface 524 as well as in other surfaces of the substrate 520.

Turning to FIGS. 11–17, a fiber optic chip 110 is shown which is made by the process in accordance with the present invention in which an etch stop layer 100 is provided on surface 124 of the substrate 120. The inclusion of the etch stop layer 100 is a principal difference between the process used to make the fiber optic chip 10 illustrated in FIGS. 3–10 and the process used to make the fiber optic chip 110 depicted in FIGS. 11–18. Use of an etch stop layer 100 permits a fiber channel 134 to pass entirely through the substrate 120.

Figure 11:
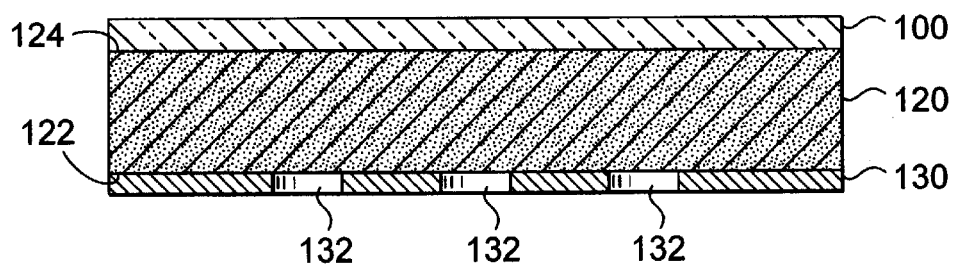
FIG. 11 schematically illustrates a cross-sectional view of a substrate having a masking layer and an etch stop layer disposed on opposite sides of the substrate, where the masking layer includes apertures to define intended locations of fiber channels.
Figure 15:
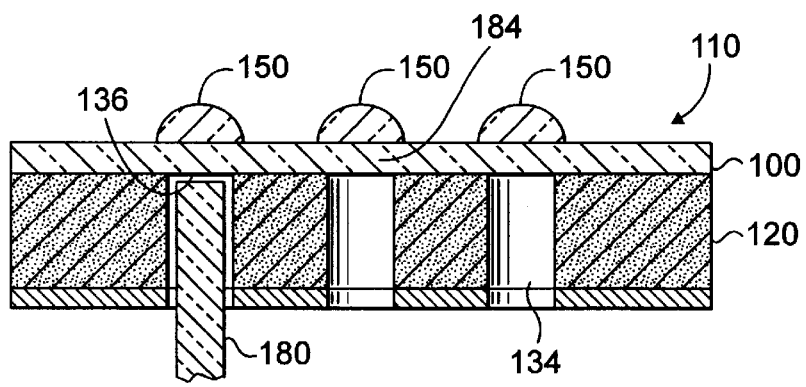
FIG. 15 schematically illustrates a cross-sectional view of a fiber optic chip formed from the substrate of FIG. 14 having lenslets formed by processing of the lenslet preforms depicted in FIG. 14.
Figure 16:
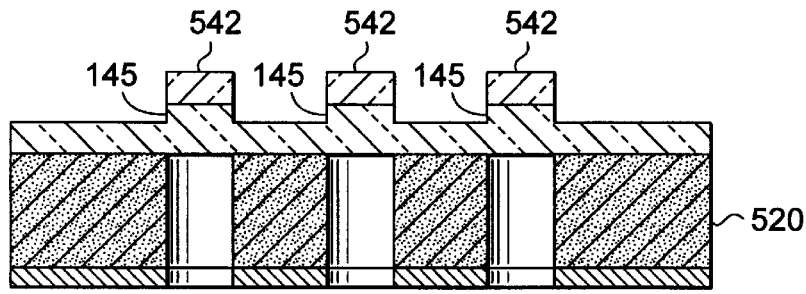
FIG. 16 schematically illustrates a cross-sectional view of a substrate having portions of the photosensitive lenslet material layer and the etch stop layer removed to create lenslet preforms disposed on pedestals.
Figure 17:
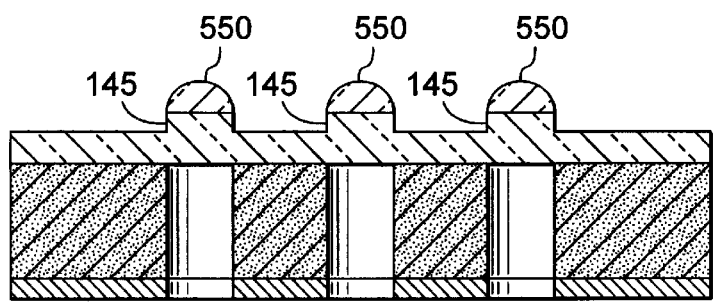
FIG. 17 schematically illustrates a cross-sectional view of a fiber optic chip formed from the substrate of FIG. 16 having lenslets formed by processing of the lenslet preforms depicted in FIG. 16.
Figure 18:
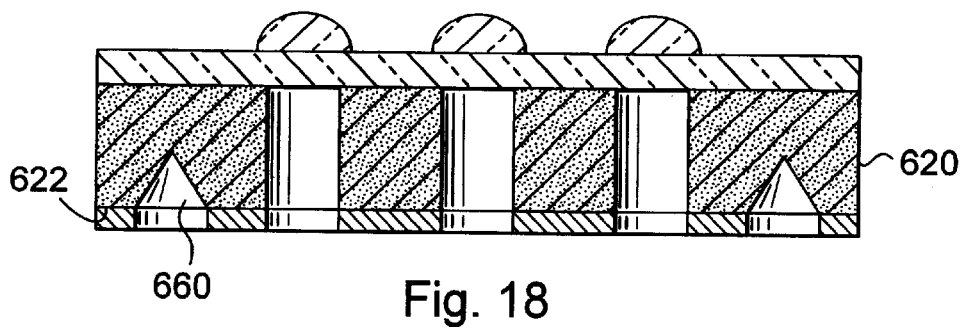
FIG. 18 schematically illustrates a cross-sectional view of a fiber optic chip in which an alignment feature is provided.

Beginning with step 1000 of FIG. 1, an etch stop layer 100 is provided on a second surface 124 of the substrate 120 opposite a first surface 122 of the substrate 120 on which a masking layer 130 is provided, as depicted in FIG. 11. The etch stop layer 100 may comprise a suitable material, such as silicon nitride or silicon dioxide, capable of resisting the removal of substrate during the subsequent processing. In addition, the etch stop layer 100 should be optically transparent to the light transmitted by a fiber 180 retained in the fiber optic chip 110, as shown in FIG. 15. Typically, the etch stop layer 100 may have a thickness of one to three microns. In addition, the masking layer 130 is provided on the first surface 122 of the substrate 120, at step 1010, in a similar fashion to that described above with respect to the configuration of FIG. 3. While the flowchart of FIG. 1 shows step 1000 occurring before step 1010, the masking layer 130 can also be provided prior to providing the etch stop layer 100.

Figure 12:
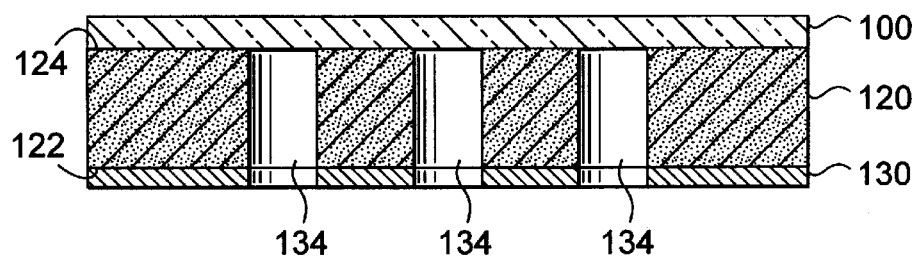
FIG. 12 schematically illustrates a cross-sectional view of the substrate of FIG. 11 with a portion of the substrate removed to create fiber channels.

When the etch stop layer 100 is used, the step of creating the fiber channels 134, step 1020, may include the creation of fiber channels 134 that extend from the first surface 122 of the substrate 120 to the second surface 124 of the substrate 120, as shown in FIG. 12. A first advantage provided by the etch stop layer 100 is the ability to control the depth of the channels 134. By optionally selecting the composition of the etch stop layer 100 to include a material substantially resistant to the substrate removal process of step 1020, the substrate material within the channels can be removed, or etched away, until the etch stop layer 100 is encountered. In addition, since no substrate material is needed to form a bridge portion between the channels 134 and respective lenslets 150, as shown in FIG. 15, the substrate 120 need not comprise a material that is optically transparent to light transmitted by the fiber 180. Likewise, the substrate 120 need not comprise a material that is optically transparent to the light used to expose the lenslet material layer 140 in the process of forming lenslets from the lenslet material layer. Consequently, the use of an etch stop layer 100 permits the use of a greater range of substrate materials. For example, the substrate 120 may be formed of silicon.

Figure 13:
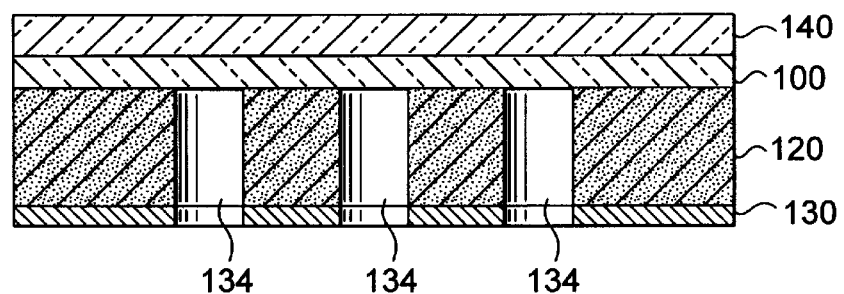
FIG. 13 schematically illustrates a cross-sectional view of the substrate of FIG. 12 having a photosensitive lenslet material layer disposed on the etch stop layer.
Figure 14:
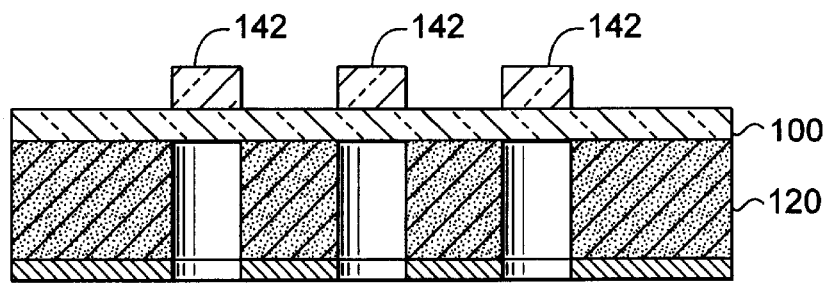
FIG. 14 schematically illustrates a cross-sectional view of the substrate of FIG. 13 having portions of the photosensitive lenslet material layer removed to create lenslet preforms in registry with the fiber channels.

Returning to FIG. 1, the process proceeds by providing, at step 1030, a photosensitive lenslet material layer 140 on the etch stop layer 100, as shown in FIG. 13. The composition of the lenslet material layer 140 and the method of its application may be similar to that described above with respect to the configuration of FIG. 5. The principal difference between providing the lenslet material layer 140 in the configuration as shown in FIG. 13 relative to providing the lenslet material layer in the configuration shown in FIG. 5 is that the lenslet material layer 140 is provided on the etch stop layer 100, rather than on the second surface 24 of the substrate 20.

The remaining steps of the process, steps 1040 through 1060, may be performed to provide the configurations illustrated in FIGS. 14–17 in substantially the same manner as described in connection with the respective configurations shown in FIGS. 6–9. Elements shown in the embodiment of FIGS. 14–17, which correspond to the same elements shown in the embodiment of FIGS. 6–9, are designated by the addition of 100 to the reference marks used in FIGS. 6–9. Likewise, the optional step of providing an alignment feature, at step 1070, may be performed to yield the configuration of FIG. 18 in substantially the same manner as described in connection with the configuration of FIG. 10. The alignment feature 660 may be formed by anisotropic wet etching, such as etching by KOH, to create an alignment feature 660 in the form of V-shaped grooves or V-shaped pits in [100]-oriented silicon. Alternatively, wet or dry etching may be used to create an alignment feature 660 having vertical sidewalls perpendicular to the first surface 622 of the substrate 620 in [110]-oriented silicon.

Figure 19:
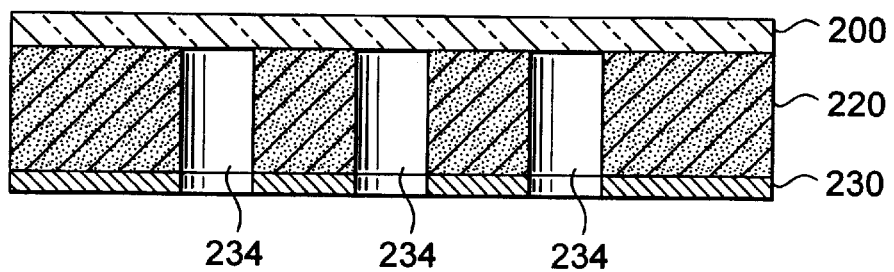
FIG. 19 schematically illustrates a cross-sectional view of a substrate having fiber channels and an etch stop layer.
Figure 20:
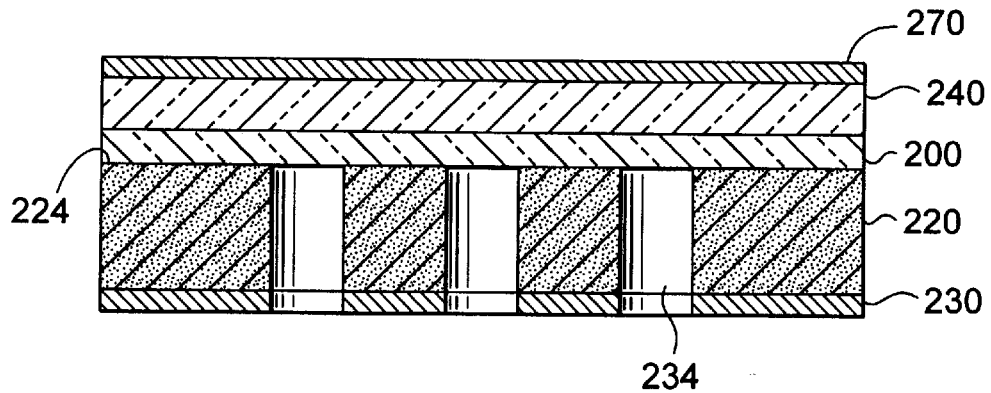
FIG. 20 schematically illustrates a cross-sectional view of the substrate of FIG. 19 having a lenslet material layer disposed on the etch stop layer and a photosensitive material layer disposed on the lenslet material layer.
Figure 22:
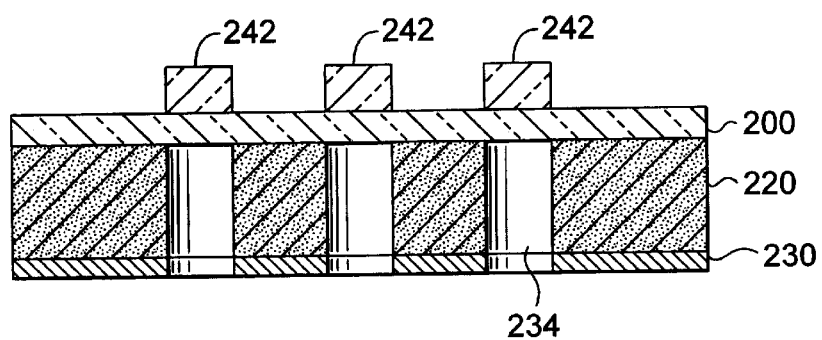
FIG. 22 schematically illustrates a cross-sectional view of the substrate of FIG. 21 having portions of the photosensitive lenslet material layer removed to create lenslet preforms in registry with the fiber channels.
Figure 23:
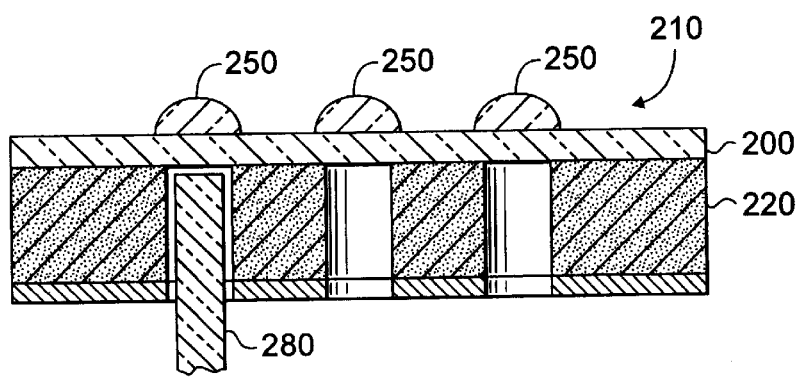
FIG. 23 schematically illustrates a cross-sectional view of a fiber optic chip formed from the substrate of FIG. 22 having lenslets formed by processing of the lenslet preforms depicted in FIG. 22.
Figure 24:
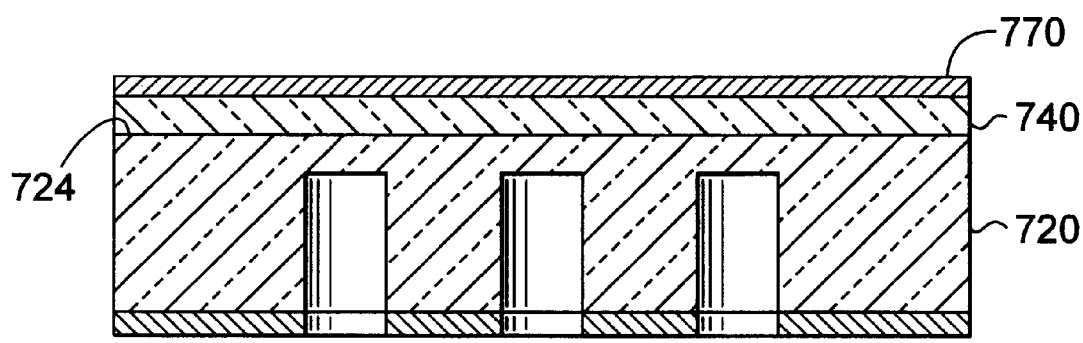
FIG. 24 schematically illustrates a cross-sectional view of a substrate having a lenslet material layer disposed on the substrate and a photosensitive material layer disposed on the lenslet material layer.

In each of the above processes, the lenslet material is preferably selected to be photosensitive. However, it may be desirable to create lenslets from materials that are not photosensitive. For example, it may be desirable to form lenslets from a low melting temperature glass. Accordingly, the flowchart of FIGS. 2A and 2B diagram a process for creating a fiber optic chip 210 having lenslets 250 which may be formed from a non-photosensitive material. In this variation of the process shown in FIGS. 2A and 2B, steps 1100 through 1120 are substantially similar to steps 1000 through 1020 described in connection with FIG. 1. A configuration of the substrate 220 that results from the process of steps 1100 through 1120 is depicted in FIG. 19. The substrate shown in FIG. 19 is similar to the structure depicted in FIG. 12, but where like elements are designated with reference marks with a 200-series reference number instead of a 100-series reference number. Likewise, as shown in FIG. 20, a lenslet material layer 240 may be applied to the etch stop layer 200, at step 1130, in an analogous manner to that described with respect to step 1030 of FIGS. 1 and 13. Alternatively, the lenslet material layer 740 may be provided directly on the second surface 724 of the substrate 720 for a process which does not use the optional etch stop layer, as shown in FIG. 24. For illustration purposes, FIGS. 19–23 depict the configuration in which an etch-stop layer 200 is provided.

Figure 2A:
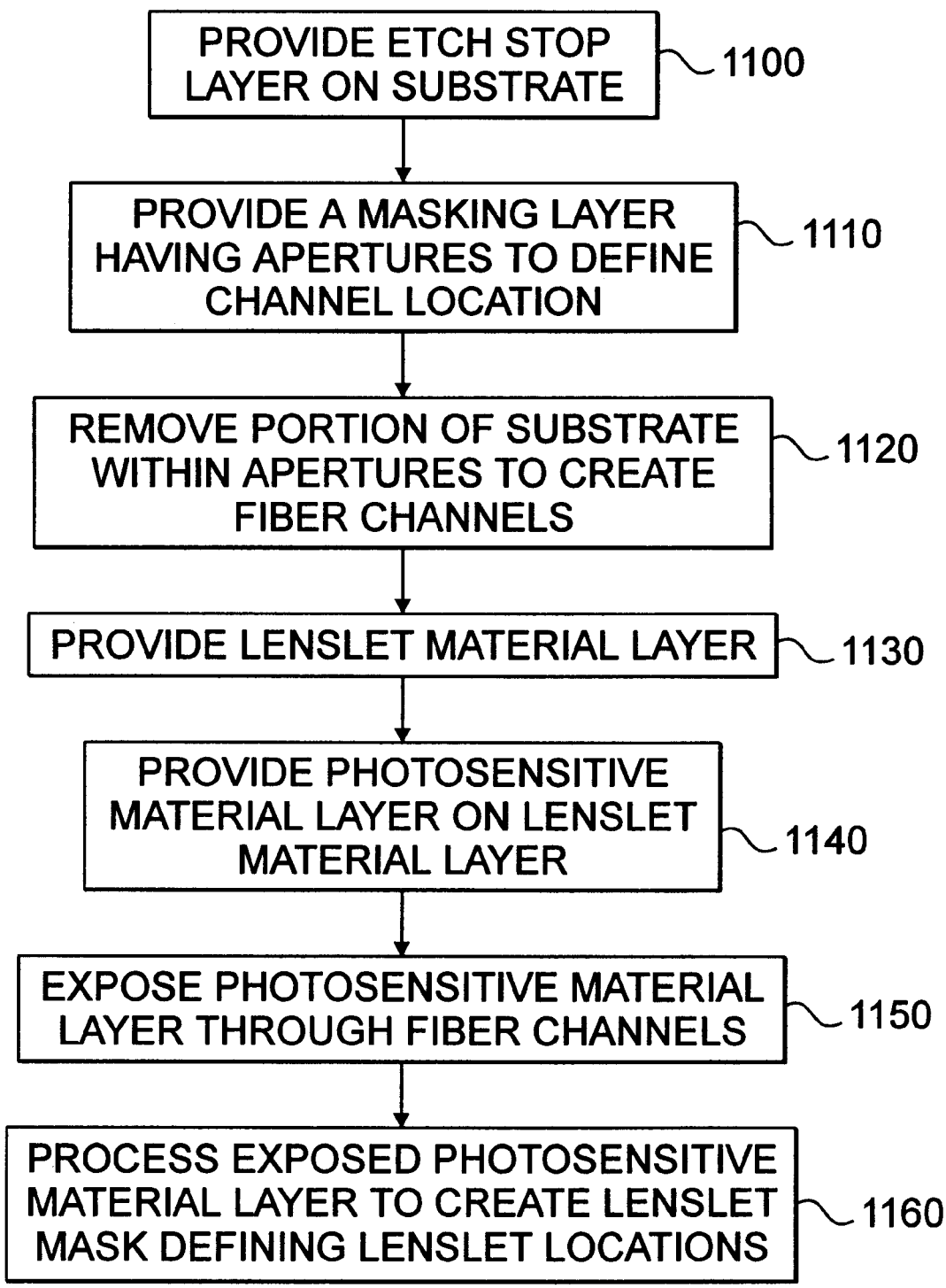
FIGS. 2A and 2B illustrate a flowchart representing another process of the present invention for creating a fiber optic chip having a fiber optic channel positioned in registry with a lenslet.
Figure 2B:
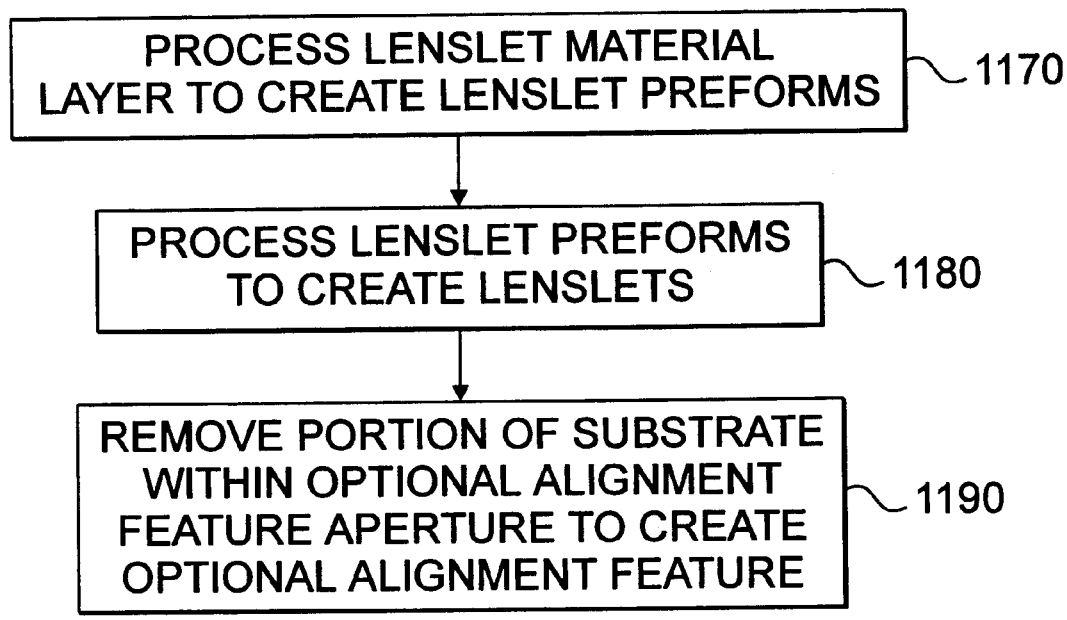
Figure 3:
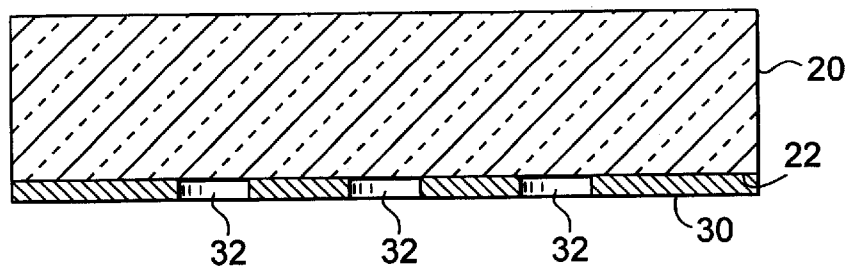
FIG. 3 schematically illustrates a cross-sectional view of a substrate on which a masking layer is disposed to mark intended locations of fiber channels.

A principal difference between the steps of providing a lenslet material layer by the process of FIG. 1 and the process of FIGS. 2A and 2B is that the lenslet material layer 240 provided by step 1130 need not be photosensitive. However, the lenslet material layer 240 should comprise a material that is optically transparent to the wavelength of light to be transmitted by fiber 280. In addition, the lenslet material layer 240 should be transparent to the wavelength of light used to expose an overlying photosensitive material layer 270. The lenslet material layer 240 may comprise, for example, a low melting temperature plastic or glass, such as a phospho-silicate or lead-silicate glass.

Since the lenslet material layer 240 need not be photosensitive, a photosensitive material layer 270 is applied, at step 1140 of FIG. 2A, on the lenslet material layer 240 to create the substrate structure shown in FIG. 20. Likewise, in the configuration where an etch stop layer is not used, the photosensitive material layer 770 is applied on the lenslet material layer 740, as shown in FIG. 20. The photosensitive material layer 270 is provided so that the photosensitive material layer 270 may be patterned to mark the locations of lenslet preforms 242 as shown in FIG. 22. The photosensitive material layer 270 may comprise photoresist, for example, or any other photo-patternable material which can create a lenslet mask 275 used in creating the lenslet preforms 242.

Figure 21:
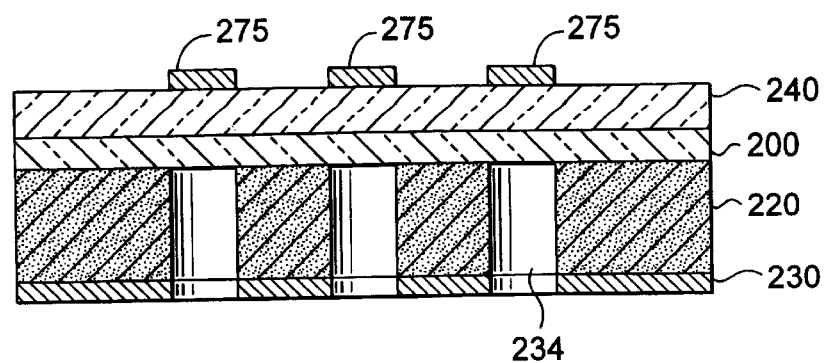
FIG. 21 schematically illustrates a cross-sectional view of the substrate of FIG. 20 having portions of the photosensitive material layer removed to create a lenslet mask in registry with the fiber channels.

The photosensitive material layer 270 is patterned, at step 1150, by exposing the photosensitive material layer 270 with a selected wavelength of light transmitted through the channels 234. The exposure of the photosensitive material layer 270 creates exposed regions within the photosensitive material layer 270 which are in registry with the channels 234. Standard photoresist processing techniques, or other suitable methods, may be used to selectively remove the unexposed portions of the photosensitive material layer 270, at step 1160, to create a lenslet mask 275, as shown in FIG. 21.

The lenslet preforms 242 are created, at step 1170 of FIG. 2B, by selective removal of a portion of the lenslet material layer 240 which is not covered by the lenslet mask 275, as shown in FIG. 22. The method of removing the portions of the lenslet material layer 240 may comprise physical etching, focused ion-beam milling, photochemical etching, electrochemical etching, and wet and dry chemical etching. The lenslet mask 275 may be removed during the lenslet preform creation step, or may be removed subsequent to the preform creation step. Once the lenslet preforms 242 are formed, the lenslets 250 are created, at step 1180 of FIG. 2B, for example by heating, as shown in FIG. 23.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A process for creating a fiber optic chip for retaining an optical fiber comprising:
providing a masking layer on a first surface of a substrate, the masking layer comprising a mask aperture;
selectively removing a portion of the substrate within the mask aperture to create a fiber channel;
providing a processing material layer on a second surface of the substrate opposite the first substrate surface;
exposing the processing material layer with light of a selected wavelength transmitted through the fiber channel to create an exposed region of the processing material layer in registry with the fiber channel;
selectively removing an unexposed region of the processing material layer to create a lenslet preform at the exposed region in registry with the fiber channel; and
processing the lenslet preform to impart a lenticular shape to the preform, to create a lenslet in registry with the fiber channel.

2. A process according to claim 1 wherein the masking layer comprises an alignment feature aperture, and wherein the process comprises the step of selectively removing a portion of the substrate within the alignment layer aperture to create an alignment feature in the substrate.

3. A process according to claim 2 wherein the step of creating an alignment feature comprises anisotropic etching of the substrate.

4. A process according to claim 2 wherein the step of creating an alignment feature comprises forming an alignment feature having a sidewall inclined with respect to the first surface of the substrate.

5. The process according to claim 1 wherein the masking layer comprises a metal or silicon nitride.

6. The process according to claim 1 wherein the masking layer is resistant to reactive ion etching.

7. The process according to claim 1 wherein the step of selectively removing a portion of the substrate comprises reactive ion etching.

8. The process according to claim 1 wherein the step of selectively removing a portion of the substrate creates a fiber channel having an end wall disposed within the interior of the substrate.

9. The process according to claim 1 wherein the processing material layer comprises photoresist.

10. The process according to claim 1 wherein the processing material layer comprises a lenslet forming layer disposed adjacent the substrate and a photosensitive layer disposed adjacent the lenslet forming layer.

11. The process according to claim 10 wherein the step of exposing the processing material layer comprises the step of exposing the photosensitive layer through the fiber channel with the light of a selected wavelength to create an exposed region of the photosensitive layer.

12. The process according to claim 11 wherein the step of selectively removing the unexposed region of the processing material layer comprises the step of selectively removing the unexposed region of the photosensitive layer, thereby providing a lenslet mask comprising the exposed region of the photosensitive layer for masking a portion of the lenslet forming layer.

13. The process according to claim 12 wherein the step of selectively removing the unexposed region of the photosensitive material layer comprises the step of selectively removing the portion of the lenslet forming layer not masked by the lenslet mask to create the lenslet preform.

14. The process according to claim 13 wherein the step of processing the lenslet preform comprises heating the lenslet preform to impart the lenticular shape.

15. The process according to claim 1 wherein the processing material layer comprises an etch stop layer adjacent the second surface of the substrate.

16. The process according to claim 15 wherein the step of selectively removing a portion of the substrate comprises removing a portion of the substrate proximate the second substrate surface.

17. The process according to claim 15 wherein the etch stop layer is substantially transparent to the selected wavelength of light.

18. The process according to claim 15 wherein the etch stop layer comprises at least one of silicon nitride and silicon dioxide.

19. The process according to claim 15 wherein the step of selectively removing the unexposed region of the processing material layer comprises selectively removing a portion of the etch stop layer.

20. The process according to claim 15 wherein the processing material layer comprises a lenslet forming layer disposed adjacent the etch stop layer and a photosensitive layer adjacent the lenslet forming layer.

21. The process according to claim 20 wherein the step of exposing the processing material layer comprises the step of exposing the photosensitive layer through the fiber channel with the light of the selected wavelength to create an exposed region of the photosensitive layer.

22. The process according to claim 21 wherein the step of selectively removing the unexposed region of the processing material layer comprises the step of selectively removing the unexposed region of the photosensitive layer, thereby providing a lenslet mask comprising the exposed region of the photosensitive layer for masking a portion of the lenslet forming layer.

23. The process according to claim 22 wherein the step of selectively removing the unexposed region of the processing material layer comprises the step of selectively removing the portion of the lenslet forming layer not masked by the lenslet mask to create the lenslet preform.

24. The process according to claim 23 wherein the step of processing the lenslet preform comprises heating the lenslet preform to impart the lenticular shape.

25. The process according to claim 24 comprising the step of removing the lenslet mask.

26. The process according to claim 15 wherein the photosensitive layer comprises photoresist.

27. The process according to claim 1 wherein the substrate is substantially transparent to the selected wavelength of light.

28. The process according to claim 1 wherein the step of processing the lenslet preform comprises heating the lenslet preform to impart the lenticular shape.

29. A process for creating a fiber optic chip for retaining an optical fiber in a fiber channel, comprising:
   providing an etch stop layer on a surface of a substrate;
   providing a processing material layer on the etch stop layer;
   exposing the processing material layer with light of a selected wavelength transmitted through the fiber channel to create an exposed region of the processing material layer in registry with the fiber channel;
   selectively removing the unexposed region of the processing material layer to create a lenslet preform in registry with the fiber channel; and
   processing the lenslet preform to impart a lenticular shape to the preform to create a lenslet in registry with the fiber channel.

30. The process according to claim 29 wherein the etch stop layer is substantially transparent to the selected wavelength of light.

31. The process according to claim 29 wherein the etch stop layer comprises at least one of silicon nitride or silicon dioxide.

32. The process according to claim 29 comprising selectively removing a portion of the etch stop layer.

33. The process according to claim 29 wherein the processing material layer comprises a lenslet forming layer disposed adjacent the etch stop layer and a photosensitive layer disposed adjacent the lenslet forming layer.

34. The process according to claim 29 wherein the photosensitive layer comprises photoresist.

35. The process according to claim 34 wherein the step of exposing the processing material layer comprises the step of exposing the photosensitive layer through the fiber channel with the light of the selected wavelength to create an exposed region of the photosensitive layer.

36. The process according to claim 35 wherein the step of selectively removing the unexposed region of the processing material layer comprises the step of selectively removing the unexposed region of the photosensitive layer, thereby providing a lenslet mask comprising the exposed region of the photosensitive layer for marking a portion of the lenslet forming layer.

37. The process according to claim 36 wherein the step of selectively removing the unexposed region of the processing material layer comprises the step of selectively removing the portion of the lenslet forming layer not masked by the lenslet mask to create the lenslet preform.

38. The process according to claim 37 wherein the step of processing the lenslet preform comprises heating the lenslet preform to impart the lenticular shape.

39. The process according to claim 37 comprising the step of removing the lenslet mask.

40. A process for creating a fiber optic chip for retaining an optical fiber, comprising:
   providing a substrate having a fiber channel disposed therein, the fiber channel extending into the substrate from a first substrate surface;
   providing a processing material layer disposed on a second surface of the substrate opposite the first substrate surface;
   exposing the processing material layer with light of a selected wavelength transmitted through the fiber channel to create an exposed region of the processing material layer in registry with the fiber channel;
   selectively removing an unexposed region of the processing material layer to create a lenslet preform in registry with the fiber channel; and
   processing the lenslet preform to impart a lenticular shape to the preform, thereby creating a lenslet in registry with the fiber channel.

* * * * *